(12) United States Patent
Jackson et al.

(10) Patent No.: US 10,124,962 B2
(45) Date of Patent: Nov. 13, 2018

(54) ATTACHMENT PLATE FOR ALL-STEEL RECIPROCATING FLOOR SLAT SYSTEM

(71) Applicant: Keith Manufacturing Co., Madras, OR (US)

(72) Inventors: Daniel W. Jackson, Madras, OR (US); Randall Mark Foster, Madras, OR (US); Nathan Keeley, Madras, OR (US); Victor Matthews, Madras, OR (US); Scott Delamarter, Madras, OR (US)

(73) Assignee: Keith Manufacturing Co., Madras, OR (US)

( * ) Notice: Subject to any disclaimer, the term of this patent is extended or adjusted under 35 U.S.C. 154(b) by 0 days.

(21) Appl. No.: 15/979,258

(22) Filed: May 14, 2018

(65) Prior Publication Data

US 2018/0257869 A1 Sep. 13, 2018

Related U.S. Application Data

(63) Continuation of application No. 15/342,602, filed on Nov. 3, 2016, now Pat. No. 9,969,559, which is a continuation-in-part of application No. 15/224,196, filed on Jul. 29, 2016, now abandoned.

(60) Provisional application No. 62/250,249, filed on Nov. 3, 2015, provisional application No. 62/198,596, filed on Jul. 29, 2015.

(51) Int. Cl.
*B65G 25/04* (2006.01)
*B65G 25/06* (2006.01)

(52) U.S. Cl.
CPC ................ *B65G 25/065* (2013.01)

(58) Field of Classification Search
USPC .......................................... 198/750.1, 750.2
See application file for complete search history.

(56) References Cited

U.S. PATENT DOCUMENTS

| | | |
|---|---|---|
| 2,973,856 A | 3/1961 | Brooks |
| 4,492,303 A | 1/1985 | Foster |
| RE33,196 E | 4/1990 | Foster |
| 5,063,981 A | 11/1991 | Jonkka |
| 5,228,556 A | 7/1993 | Quaeck |
| 5,355,994 A | 10/1994 | Foster |
| 5,655,845 A | 8/1997 | Foster |
| 6,000,530 A | 12/1999 | Foster |
| 6,257,396 B1 | 7/2001 | Quaeck |
| 6,575,293 B2 | 6/2003 | Foster |
| 6,651,806 B2 | 11/2003 | Hallstrom |
| 6,763,933 B1 | 7/2004 | Wilkens |

(Continued)

FOREIGN PATENT DOCUMENTS

| | | |
|---|---|---|
| CA | 2162182 | 5/1997 |
| EP | 0638758 | 2/1995 |

(Continued)

*Primary Examiner* — Douglas A Hess
(74) *Attorney, Agent, or Firm* — Wells St. John P.S.

(57) ABSTRACT

A roll-formed steel slat for use in a reciprocating floor slat conveyor system. The roll-formed steel slat is formed in a manner so as to have an upper, load-carrying surface, and a pair of downwardly depending side legs. Each side leg terminates in a foot. One foot is vertically offset from the other to provide a "hold-down" function that prevents the slat from vertically rising as the slat reciprocates back-and-forth.

2 Claims, 10 Drawing Sheets

(56) References Cited

U.S. PATENT DOCUMENTS

| | | | |
|---|---|---|---|
| 6,848,569 B1 | 2/2005 | Foster | |
| 7,083,041 B1 | 8/2006 | Foster | |
| 7,152,729 B2 | 12/2006 | Wilkens | |
| 7,243,780 B1 | 7/2007 | Foster | |
| 7,461,738 B1 | 12/2008 | Delmarter | |
| 8,083,052 B2 | 12/2011 | Drago | |
| 9,278,812 B2 * | 3/2016 | Feigner | B65G 25/065 |
| 9,963,298 B2 * | 5/2018 | Jackson | B65G 25/065 |
| 9,969,559 B2 * | 5/2018 | Jackson | B65G 25/065 |

FOREIGN PATENT DOCUMENTS

| | | |
|---|---|---|
| EP | 1428775 | 7/2007 |
| EP | 1865120 | 12/2007 |
| EP | 2330062 | 6/2011 |
| FR | 2766905 | 2/1999 |
| NL | 1041004 | 10/2016 |

* cited by examiner

ATTACHMENT PLATE FOR ALL-STEEL RECIPROCATING FLOOR SLAT SYSTEM

TECHNICAL FIELD

The present disclosure relates to reciprocating floor slat conveyor systems.

BACKGROUND

Reciprocating floor slat conveyor systems are well-known. These systems are often built into the floors of truck trailers that haul materials in bulk.

The typical reciprocating floor slat conveyor system consists of multiple, bearing mounted, parallel floor slats that are driven back-and-forth in a reciprocating action. The action or motion of the floor slats are typically driven in "stages" as follows: First, in the case of truck trailers, all of the slats are moved in one direction, at the same time. This stage moves the load on the floor a short distance toward the exit end of the trailer. Then, a lesser number of slats are retracted, or returned, in the opposite direction (typically, in stages of one-third of the slats at a time). Because of the fewer number of moving slats involved in the return stage, the greater total friction between the load and the larger number of nonmoving slats allows the moving slats in the return stage to slide underneath the load, without moving the load backward.

Returning one-third of the slats at a time, in three separate return stages, brings all of the slats to the original start position, with the load staying in place during the return stages. Once all of the slats return, then the sequence repeats itself, with all of the slats moving, once again, toward the exit end of the trailer. This, in turn, also moves the load another short distance toward and out from the exit end of the trailer. Repetitive cycling of the slats in stages in the manner just described causes the load to be inched out from the trailer.

There is a specialized market for conveyors like the above. These systems have become a substitute for and have replaced hydraulic dump lifts for certain kinds of applications. From the standpoint of historical development, these kinds of conveyors may have been initially developed to haul bulk silage for cattle feed and similar kinds of bulk materials. Since then, they have been adapted for many other uses, such as the garbage hauling markets; and certain kinds of specialized designs have been developed that allow trucks with these conveyors to haul rock, gravel, or asphalt.

As a consequence of different market needs, many different kinds of floor slat configurations have been designed over the years to adapt reciprocating floor slat conveyors to different hauling scenarios. The floor slats themselves are usually made from aluminum, for reasons relating to weight (i.e., light weight systems are desirable for truck trailers), and due to manufacturing and installation considerations. Long lengths are required for a typical floor slat (generally corresponding to the length of a trailer). Aluminum slats can be mass produced by extrusion.

For reasons relating to the abrasive wear caused by certain kinds of loads, there has been a need to develop a successful steel floor slat system in lieu of aluminum slats. Steel slats have been used in the past in combination with aluminum slat parts. For example, spaced-apart, inverted "V"-shaped reciprocating slats have been made of steel and used in combination with spaced-apart "fixed" slats made of aluminum. This system has been used to haul certain kinds of heavy bulk material that create loading impacts and abrasive wear on the moving slats—large rock would be an example. In this design, the "moving" steel slats provide better wear characteristics for the load-carrying surfaces. They are spaced from each other a certain distance and ride on bearings that are supported by the underlying "fixed" aluminum slats. This design, as a whole, creates peaks and valleys from one side of the trailer to the other side, which is a function of the "V" shape.

The use of steel in the "V" configuration is a better design relative to all-aluminum systems for certain kinds of specialized hauling applications. However, although the design works well for certain hauling applications, it does not provide a conveyor floor surface that can be driven on with a forklift. This is a drawback that limits the use of trailers that have this type of floor configuration. In other words, the trailer tends to be used "one way" and is empty on the return.

Truck haulers would like a "steel" floor slat system that can handle the specialized loads carried by a "V"-shaped steel slat system, but one that also provides a flat conveyor floor surface, from side-to-side, so that a forklift can be driven onto the trailer's floor when empty. This would allow the same trailer to be used to haul heavy bulk materials in one direction, but after unloading, the trailer can be loaded by a forklift in a conventional way with palletized loads, if desired. This is more utilitarian and allows the trailer to be used to generate revenue on the back-haul, rather than come back empty.

For the above reason, and others discussed below, there has been a long felt need for an "all steel" reciprocating floor system that can provide multiple uses. Because of the difficulty of manufacturing a suitable steel slat system, as of yet, the reciprocating floor slat industry has been unable to create a commercially viable "all-steel" floor slat design that can provide a flat, driveable surface inside the trailer.

The foregoing and other features will be better understood upon review of the drawings and description that follows.

SUMMARY

The several embodiments described and illustrated in this specification include a roll-formed slat that may provide a load-carrying surface, or in the alternative, may have an additional strip of hardened steel attached above the roll-formed slat that provides the load bearing surface. Regardless, the roll-formed steel slat is intended to be used in a reciprocating floor slat conveyor system.

The roll-formed slat is formed from a strip of steel via a roll-forming process. The slat is formed to have at least an upper load-carrying surface, or upper surface portion, as well as a pair of side legs, one on each side of the upper load-carrying surface. Each side leg depends downwardly and laterally inwardly relative to the upper load-carrying surface. Each side leg also terminates in the shape or form of a laterally inwardly directed foot portion.

The foot portion of one side leg is vertically offset relative to the foot portion of the other side leg, in order to create a "hold-down" function relative to supporting bearings. The supporting bearings provide slidable support surfaces for back-and-forth reciprocating movement of the slat.

The purpose of the "hold-down" function is to allow the slat to capture a bearing edge in a manner so that the floor slat cannot rise substantially while the slat reciprocates. The purpose of the "hold-down" function is to impede bulk materials, making up the load (which is a typical use of reciprocating conveyors), from working downward and between different reciprocating slats. One foot portion might provide a "hold-down" function while the other foot portion (which can be vertically offset below the other one) may provide a supporting function, although design variables may dictate different arrangements.

Independent of the vertically offset feet described above, the roll-formed slat is also formed to have an upper load-carrying surface with a pair of raised stiffening beads or raised side regions. The raised stiffening beads create a valley region between the beads that has a certain depth. An attachment plate (which is used to attach the steel slat to an underlying member) rests flush on the upper load-carrying surface, between the raised stiffening beads. The attachment plate has a vertical thickness, or height, that is no greater than the height of the raised stiffening beads.

The above summary is not intended to limit the claiming of different embodiments described herein.

BRIEF DESCRIPTION OF THE DRAWINGS

In the drawings, like reference numerals and letters refer to like parts throughout the various views, and wherein.

DETAILED DESCRIPTION

Figure 1:
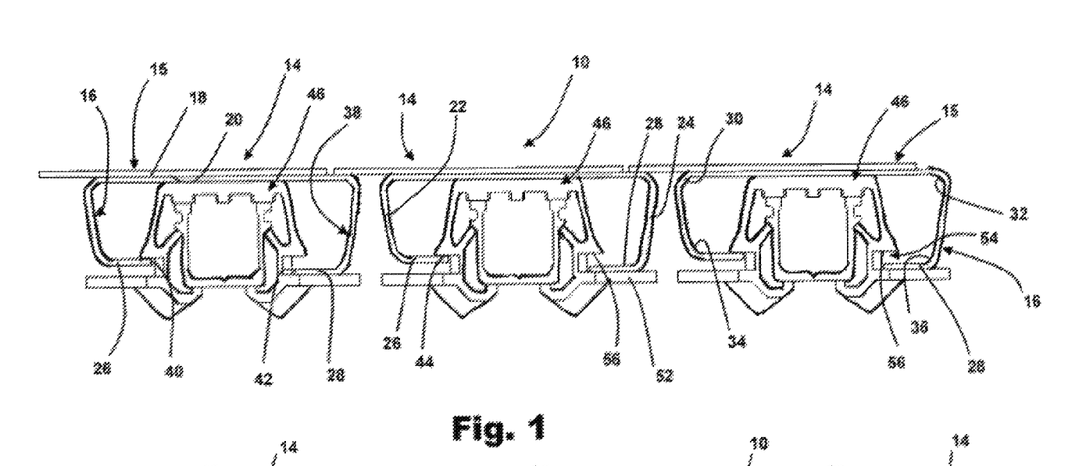
FIG. 1 is a cross-section of an all-steel floor slat system.

Referring to the drawings, and first to FIG. 1, shown generally at 10 is an improved "all-steel" floor slat system. The system 10 shown in FIG. 1 (and other figures) consists of a series of floor slats, indicated generally at 14 (further described below), that are positioned side-by-side from one side (typically a trailer wall) of the conveyor to the other side.

Figure 3:
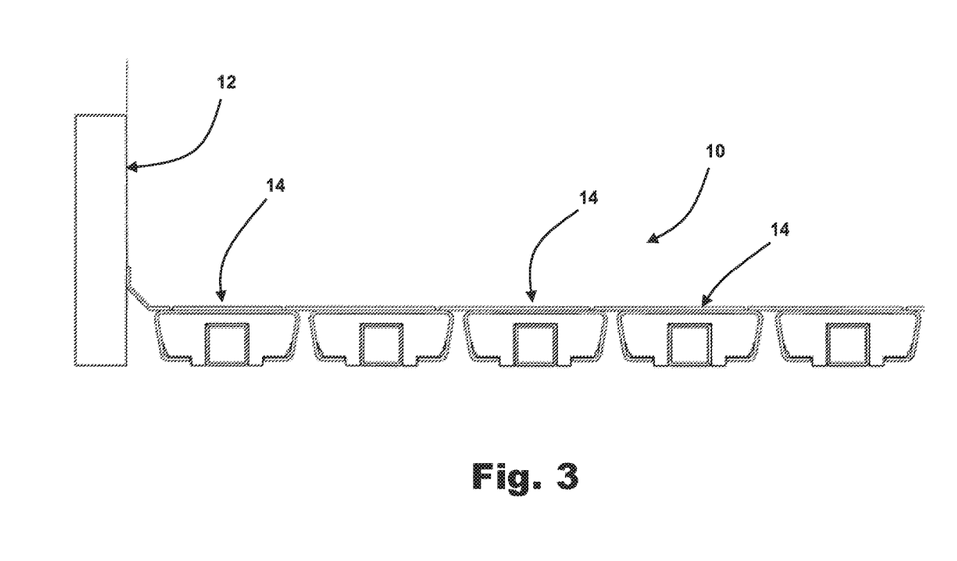
FIG. 3 is a view similar to FIGS. 1 and 2, but without showing any detail on the specific construction of slat bearings.

Referring to FIG. 3, for example, arrow 10 illustrates the general location of the conveyor system relative to one wall 12, labeled as "steel wall." The wall 12 could be a side-wall of a trailer or some other equivalent configuration. Trailer widths are typically about 96 inches, although the width can be a variable.

Returning to FIG. 1, each individual slat configuration 14 shown in the Figure consists of a flat or top slat portion that is made of a flat strip of steel (indicated generally by arrow 15); and a lower slat portion, also made of a strip of steel (indicated generally by arrow 16). Unlike the top slat portion 15, the lower slat portion 16 is roll-formed into the desired cross-sectional shape, as shown. Roll-forming is important to the design and is further discussed below.

Figure 2:
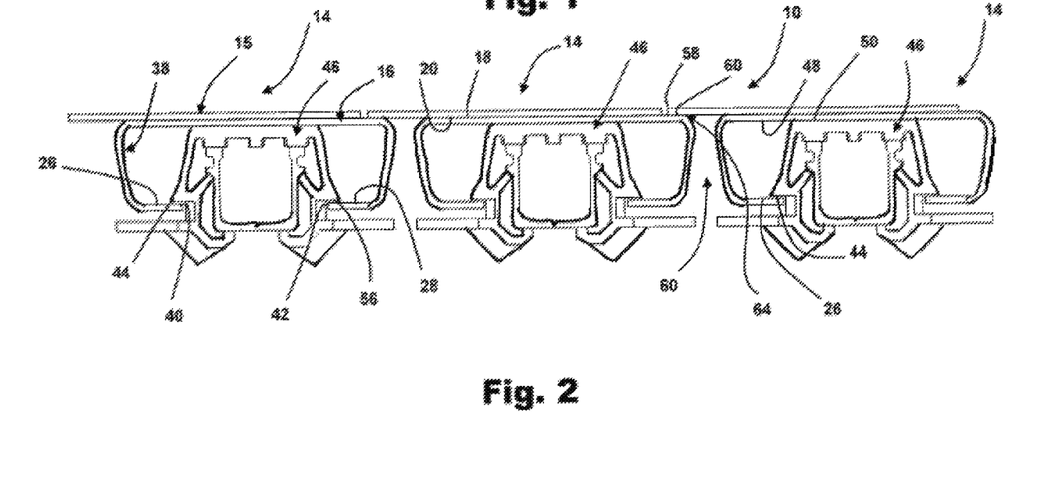
FIG. 2 is a view similar to FIG. 1, but shows a different embodiment.

The top slat portion 15 (or "top slat") provides the load bearing surface. It can be made from a strip of hardened steel, such as steel that is marketed under Hardox™ or Domex™ trademarks. As just mentioned, the top slat 15 is not roll-formed and, as can be seen in FIGS. 1-3, all of the top slats 15 collectively create a flat, load-bearing surface across the side-to-side width of the conveyor system. This configuration allows the system to carry heavy bulk materials such as glass. Once empty, a forklift can be driven onto it, to load pallets on the floor, if desired.

Each top slat 15 is suitably connected to the lower slat portion 16. The connection between the two slat portions 15, 16 can be made in many different ways, i.e., by spot welding, rivets, bolts, or other fasteners. An adhesive connection may also be possible. The point is: the top slat 15 provides a hardened steel surface that is connected to the lower slat portion 16 by any viable means that can make the needed structural connection.

The lower slat portion 16 is also made of steel, but it is a "milder" form of steel that can be roll-formed. "Mild" steel is a known term of art.

FIG. 1 illustrates one version of the lower slat portion 16. There, the lower slat portion 16 has an upper horizontal surface 18 that is in contact with the lower horizontal surface 20 of the top slat 15 (see left-hand slat 14 in FIG. 1). The interface between these two surfaces 18, 20, is the point where the two slat portions 15, 16 are connected, as described above. The lower slat portion 16 also has downwardly and inwardly depending legs 22, 24, one on each side, that extend down to inwardly directed, lateral "feet" 26, 28 (see central slat 14 in FIG. 2).

The lower slat portion 16 is made from a single strip of mild steel that is dimensioned to be bent into the configuration shown in FIG. 1 (other configurations are discussed below). During the roll-forming process, the lower slat portion 16 is bent at 30, 32, 34, 36 into the shape shown in FIG. 1 (see the right-hand side of the Figure).

The slat configuration(s) 14 (i.e., the combination of portions 15 and 16) reciprocate back and forth on a bearing (indicated generally by arrow 46) with the inside surface 48 of the lower slat portion 16 riding on the top horizontal surface 50 of the bearing (see right-hand slat 14 in FIG. 2). The bearing 46 is made of conventional plastic materials of the kind that are used in reciprocating floor conveyor systems. The bearing 46 is typically designed to be load-supporting. However, for the all-steel system described here, the bearing also needs to provide a "hold-down" function and prevent "lift" of the slat 14 relative to others. This is further described below.

In the embodiment in FIG. 1, the lower slat portion 16 is roll-formed so that one of the slat feet 26 will be vertically offset (higher) relative to the other one 28 (see central slat 14 in the Figure). In FIG. 1, the left-hand slat foot 26 is shown in sliding contact with a lower lateral edge 44 of the bearing 46. The lateral edge 44 of the bearing 46 "holds down" the lower slat portion 16 and thereby prevents it from lifting upwardly, as the combination of top slat 15 and lower slat portion 16 reciprocate on the bearing 46.

It is to be appreciated that it is desired to have bearing edge 44 in close sliding contact with slat foot 26, with no gap or "slop" between the two surfaces. It is likely that the shape or angles of these surfaces will be made so that there is resistance to any upward movement when these components are installed. Moreover, it may be preferred to design bearing 46 so that is causes positive hold-down forces on each slat 14. In other words, "positive" hold-down" means that the slat and bearing combination are assembled to minimize upward movement of the slat as it reciprocates.

On the other lateral side of the lower slat portion 16, the foot 28 rests on a lower bearing flange 52. As can be seen, in this specific embodiment, there is no hold-down function because of a gap 54 (see general arrow 54 vis-à-vis the right-hand slat configuration 14 in FIG. 1) between the foot 28 and a horizontal surface 56 on the other lateral side of bearing 46. In this example, the offset allows the lower foot 28 to rest upon the bearing in a supporting relationship, rather than a "hold-down" relationship. The advantage is that the right-hand foot can be used to shift weight support from the bearing to underlying support structure (not shown).

It is to be appreciated, at this point, that the "all-steel" nature of the design disclosed here provides certain advantages over aluminum slats. One advantage is that roll-forming allows the lower slat portions 16 to have a uniform wall thickness (indicated generally by arrows 38 in FIGS. 1, 2, and 5-13) following the edge-to-edge contours of the lower slat portion 16 (i.e., from edge 40 of one slat foot 26 to the edge 42 of the other slat foot 28).

Steel also has a lower coefficient of friction, which means it should be easier to drive a steel slat back and forth on a bearing surface relative to a similar part that is made from aluminum. This provides efficiencies in that less power may be required to drive a bearing-mounted "all-steel" slat.

Steel slats also have a better degree of wear when one steel surface is sliding against another. With respect to this point, and referring now to the right-hand side of FIG. 2, each top slat portion 15 has an outer lateral edge 58 that extends over a gap 60, between slat configurations 14, and rides on the outer edge 62 of the upper surface 18 of the lower slat portion 16 (see left-hand side of FIG. 2).

Referring now to the right-hand side of FIG. 2, the interface (general arrow 64) of items 58, 62 creates an area of sliding contact that might not be practical using aluminum, for reasons relating to wear. The load on the top slat portion 15 normally presses edge 58 down onto surface 62 with the pressure of the load causing a sliding/sealing action between adjacent lateral slat configurations. Although the precise dimensions have not yet been determined, it is believed it is best to have as little overlap between surfaces 58 and 62 as possible. In other words, it is desirable to minimize the sliding contact surface in the region indicated by arrow 64.

FIG. 2 illustrates an alternative embodiment where the feet 26, 28 of the lower slat portion 16 are not offset relative to each other. In other words, the horizontal bearing surfaces 44, 56 both provide a "hold-down" function on opposite lateral sides of the bearing.

Before moving on to the other slat configurations illustrated in the drawings, it is worthwhile to discuss the roll-forming tooling needed to create the slats. Roll-forming enables slat profiles to be made out of steel, in the forms illustrated in FIGS. 1-13, and in particular, in various forms like the ones illustrated in FIG. 4.

Figure 5:
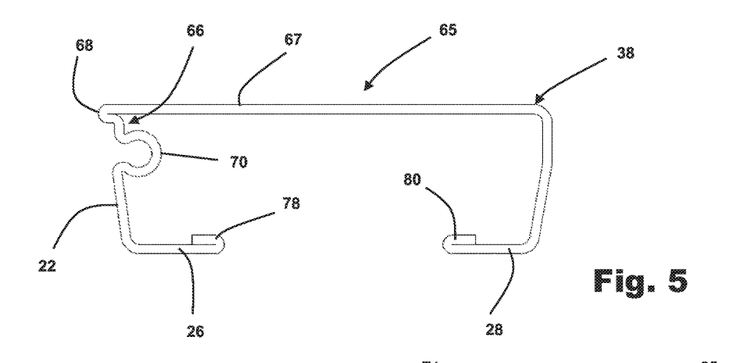
FIG. 5 is an enlarged view of one of the slat constructions in FIG. 4.
Figure 6:
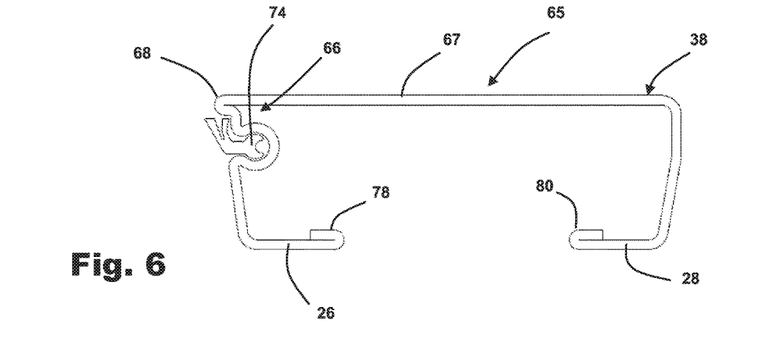
FIG. 6 is a view like FIG. 5, but shows a lateral slat seal on one side of the slat.
Figure 7:
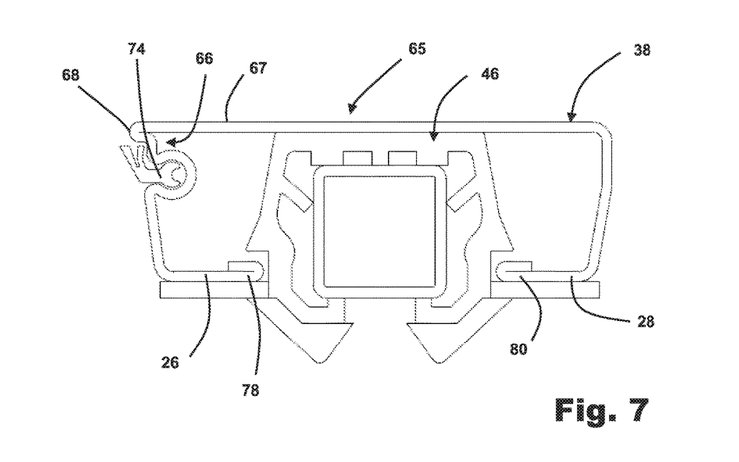
FIG. 7 is a view similar to FIGS. 5 and 6, but shows the slat on a bearing.
Figure 8:
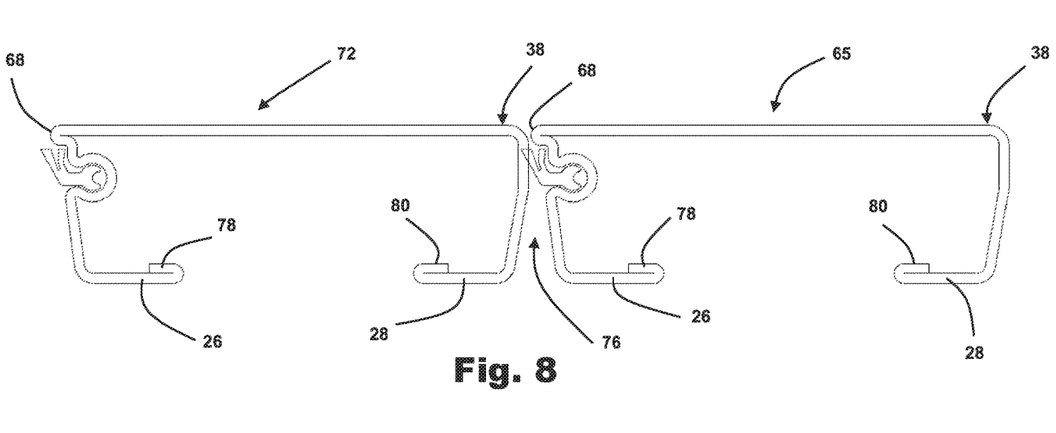
FIG. 8 is a view similar to FIG. 6, but shows two slats side-by-side.
Figure 9:
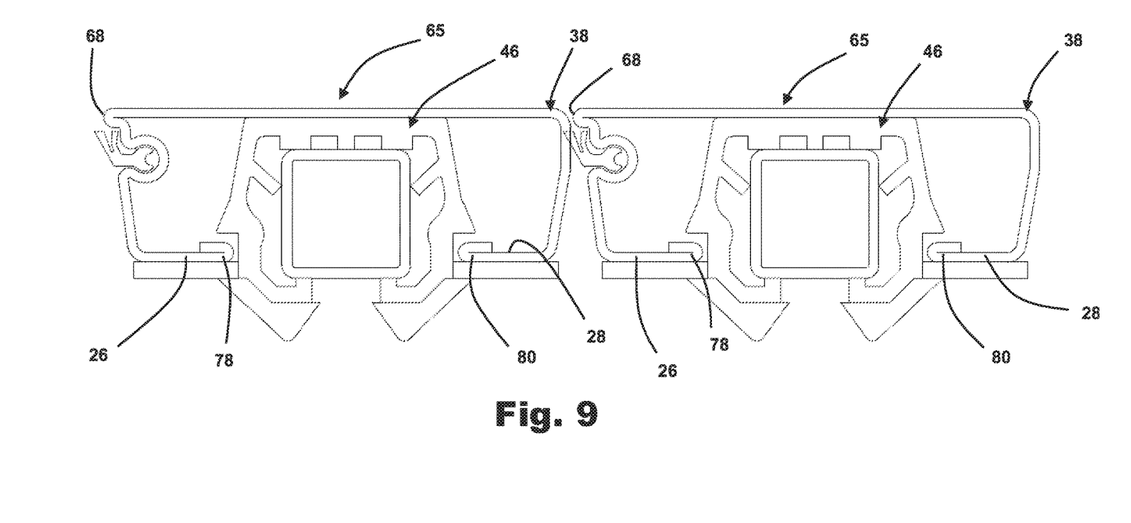
FIG. 9 is similar to FIG. 8, but shows the slats with bearings.
Figure 10:
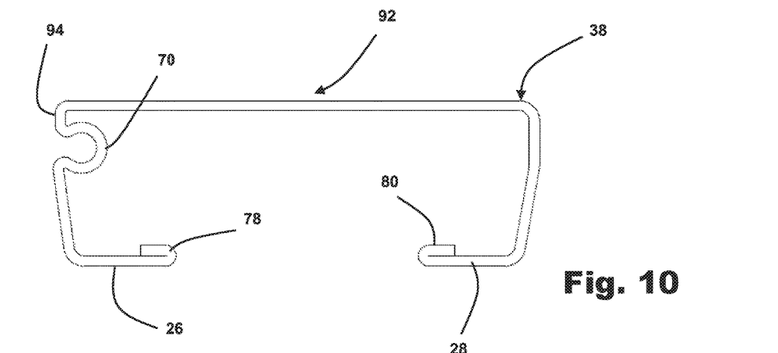
FIG. 10 is an enlarged sectional view of another one of the slat configurations shown in FIG. 4.
Figure 11:
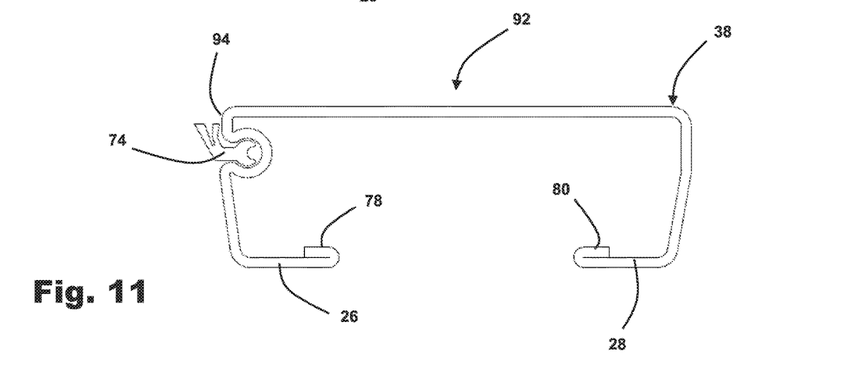
FIG. 11 is similar to FIG. 10, but shows the FIG. 10 slat with a lateral seal.
Figure 12:
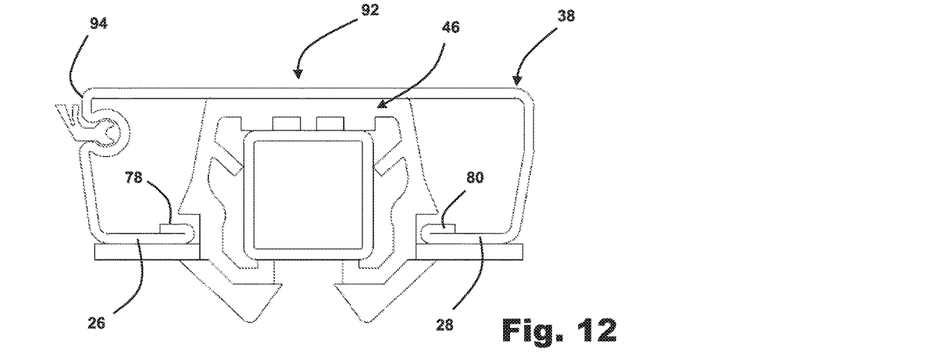
FIG. 12 is similar to FIGS. 10 and 11, but shows the slat on a bearing.
Figure 13:
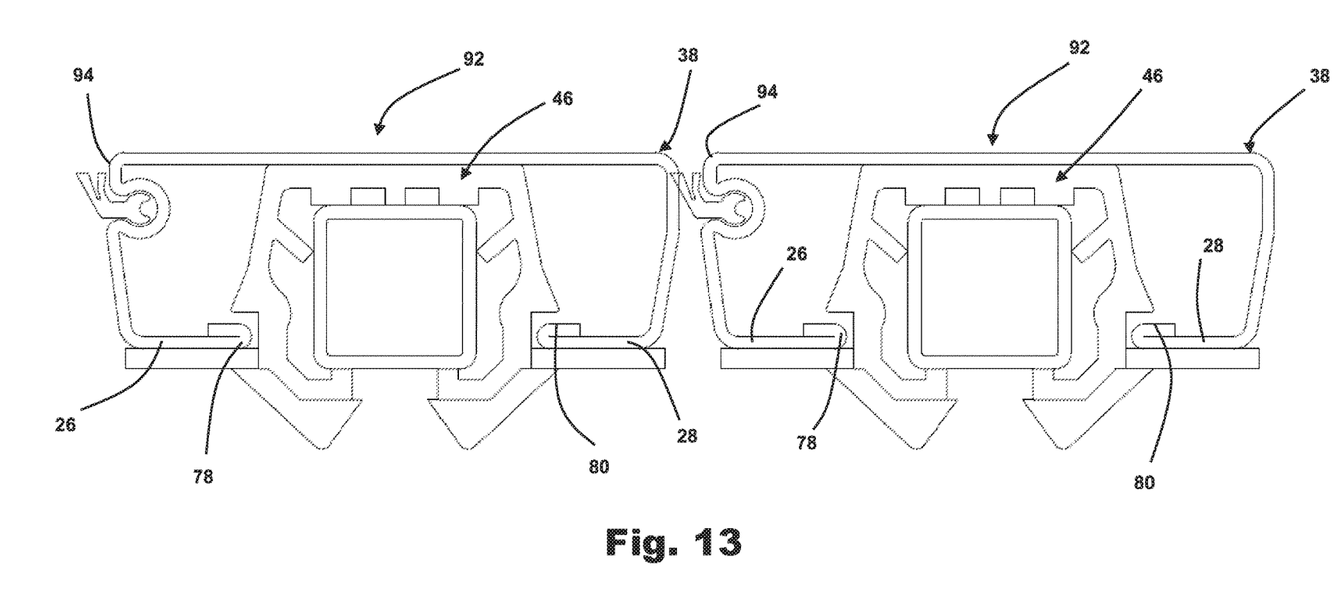
FIG. 13 is a view similar to FIG. 12, but shows two slats together, mounted side-by-side.

FIG. 5 is particularly unique because it illustrates an alternative, "one strip" slat configuration 65 that may stand alone (i.e., without the "hard" top slats 15 previously described). In other words, FIG. 5 illustrates an "all steel" floor slat that is roll-formed from a single strip of steel, with top surface 67 carrying the load. In this specific configuration, one side leg 22 can be roll-formed to have the folded side edge or side configuration that is indicated generally at 66. The folded edge provides a rounded or blunted side edge 68 for sliding or near-sliding contact with an adjacent slat 72 (see FIG. 8).

Referring again to FIG. 5, roll-forming also enables a circular recess 70 to be bent length-wise into the slat's side 22. The recess 70 would extend laterally along the length of the slat 65. The recess 70 is shaped to receive a lateral seal 74 that closes the gap 76 (see FIG. 8) between slats. An advantage to roll-forming is that the vertical position of the recess 70 is easy to adjust relative to the vertical height of side leg 22.

Using roll-forming, the configuration illustrated in the various Figs. can be made from relatively thin strips of mild steel (i.e., 16 or 18 gauge). The inner edges 78, 80 of the lateral feet 26, 28 may also be suitable for folding, in the manner illustrated in FIGS. 5-9. This may allow the lateral feet 26, 28 to function better with the type of bearing illustrated in the figures for performing either the hold-down or supporting functions described above. For example, folding the edges 78, 80, as shown, may be an improved way to attach the slat to the bearing 46. In other words, and while it is not illustrated in FIGS. 1 and 2, specifically, the folded edges 78,80, may be a better way of avoiding steel-to-plastic wear in the embodiments shown in FIGS. 1 and 2, where the feet slide back and forth against the underside of the bearing.

The slats illustrated in FIGS. 5-13 are different from the embodiments of FIGS. 1-3 in that the slat embodiments in FIGS. 5-13 do not require the "hold-down" effect or function described above. However, it is to be appreciated that the type of bends and folds illustrated in FIGS. 5-13 could be applied to the lower slat portions 16 in FIGS. 1-3. The point is: roll-forming allows uniformly thin strips of steel to be shaped in different ways for reciprocating slats in a floor conveyor.

With respect to the steel recess 70 described above, in particular, aluminum slats have been made with integrated seal recesses that are similar in shape and function. However, the aluminum slats are extruded and have required non-uniform material thickness in certain areas of the slat. This is believed to be an issue in the region of the recess. With roll-formed steel slats, wall thickness remains the same through the various bends that are created during the roll-forming process.

Figure 4:
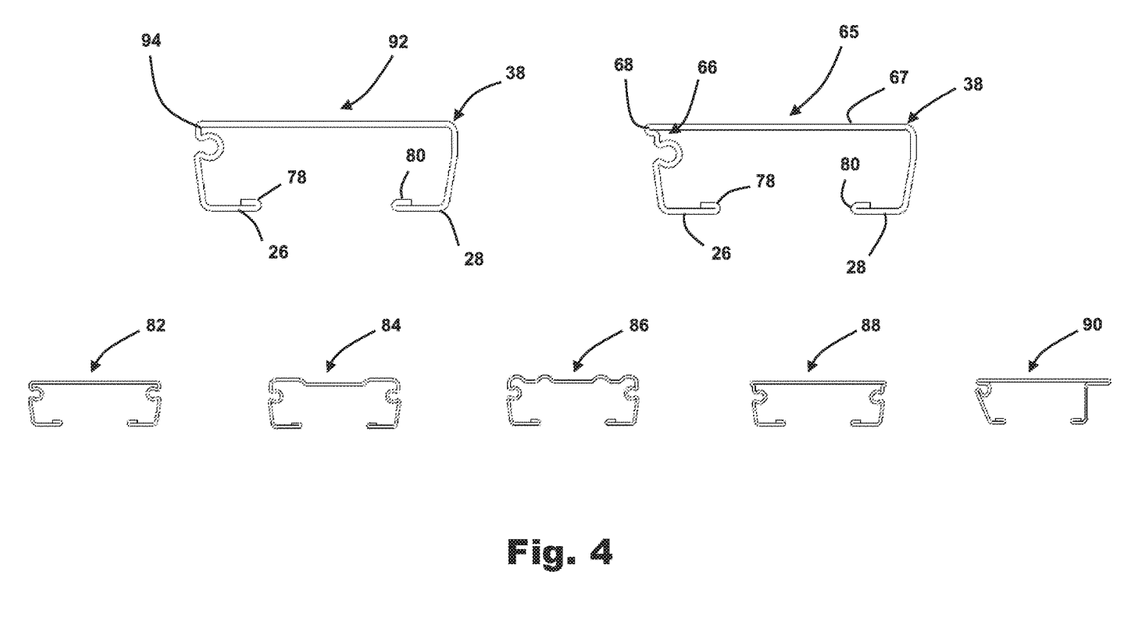
FIG. 4 illustrates a series of different slat constructions for an all-steel conveyor.

Roll-forming also enables slat profiles to be made out of steel in various cross-sectional configurations, as illustrated at 82, 84, 86, 88, 90 in the lower half of FIG. 4. Although steel weighs more than aluminum, the roll-forming process enables the wall thickness to be much less than thicknesses required by aluminum (e.g., the 16 and 18 gauge steel thicknesses discussed above), thereby reducing the total weight of the steel while still taking advantage of the better strength and wear qualities of steel versus aluminum.

Typically, roll-forming is a continuous bending operation that involves passing a long strip of steel through sets of rollers in a continuous line, with different sets incrementally making part of a bend, until the final cross-sectional shape is achieved. This allows for optimizing strip thickness while creating the variety of cross-sectional profiles disclosed here, although different profiles require a dedicated set of roll tools to create the desired final shape.

The design of the rolls may start with what is called a "flower pattern" that defines a sequence of sections of the final cross-section, each section corresponding to roll sets for making the desired bend. It is not believed that anyone in the reciprocating floor conveyor industry has conceived of the idea of using roll sets and roll-forming as a method of manufacturing an all-steel floor slat system.

FIGS. 10-13 illustrate yet another slat configuration that corresponds to the slat configuration illustrated at 92 in FIG. 4. The primary difference between configuration 92 and 65 is that the folded edge 68 (initially described relative to slat 65 in FIG. 5) is blunted, as shown at 94.

Referring now to FIGS. 14-18, the slats that make up a reciprocating floor slat conveyor need to be connected to the underlying drive system that moves the slats back-and-forth in a reciprocating action.

In current reciprocating conveyor floor systems (that use aluminum floor slats), the floor slats are pre-drilled and countersunk for a fastener (e.g., a "bolt"). The fastener extends through the thickness of the aluminum slat and has a threaded end that is connected, via a nut, to a transverse drive beam. The drive beam is moved back and forth, typically by a hydraulic cylinder. The fastener/bolt connection between the drive beam and the slat transfers the drive force from the hydraulic cylinder to the slat and causes the slat to move along with the drive beam. The fastener/bolt connection just described also represents a localized region on the slat where the slat material is subject to high stress and high wear because the connection point represents a zone for high force transfer.

Aluminum slats can be extruded with different thicknesses and/or variability in thickness when looking at a slat's cross-section. In other words, the aluminum extrusion process permits a thickening of the slat material in the region where the above bolt connection is made, for addressing the localized force transfer.

An "all-steel" floor slat will be connected to transverse drive members in generally the same way as described above. However, the all-steel slats are made via a roll-forming process from a single, uniform strip of steel that does not vary in thickness. With this method, there is no way to thicken steel wall thickness at the location of the bolt connections during the course of manufacturing the slat.

Figure 14:
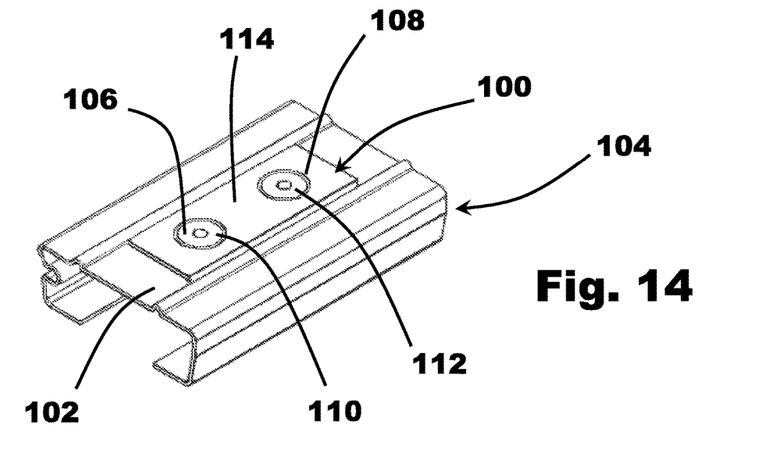
FIG. 14 is a pictorial view of an end portion of an all-steel slat, showing a slat attachment plate.

In order to address the above attachment problem in an all-steel slat, and referring to FIG. 14, shown generally at 100 is a steel attachment plate that augments the thin wall structure 102 of the steel slat (the slat is indicated generally at 104).

Figure 15:
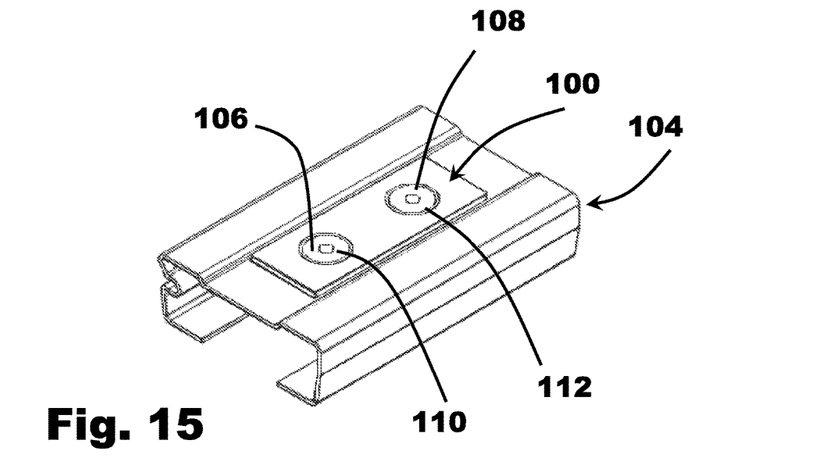
FIG. 15 is a view similar to FIG. 14, but shows a different slat cross-section relative to FIG. 14.

The attachment plate 100 shown in FIGS. 14 and 15 has two countersinks 106, 108 sized appropriately for fastener heads 110, 112. The countersinks 106, 108 and fastener heads 110, 112 are also sized and shaped so that the fastener heads 110, 112 will be more or less flush with the top surface 114 of the steel attachment plate 100.

Figure 16:
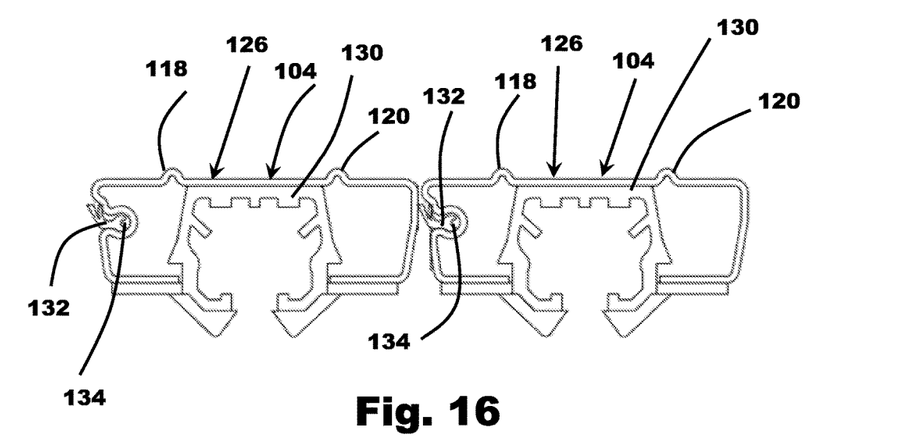
FIG. 16 is a cross-sectional view, looking end-wise, and shows two side-by-side slats mounted on bearings.
Figure 17:
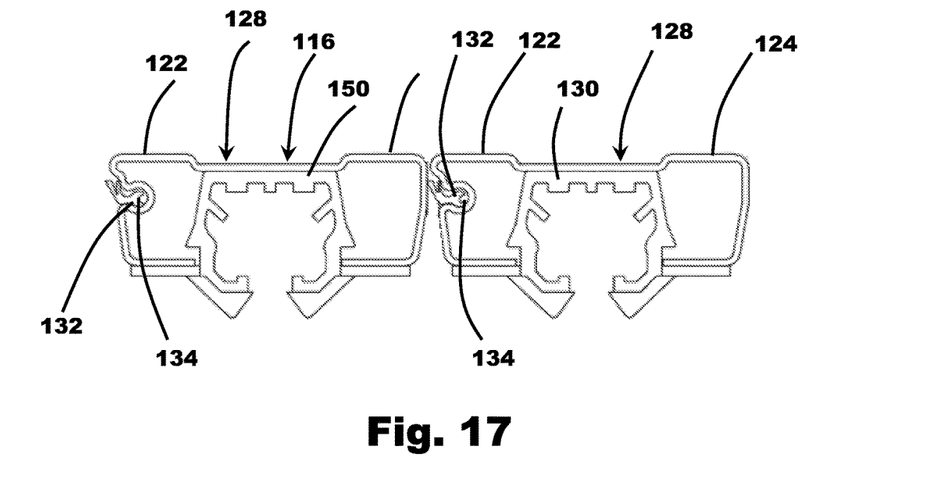
FIG. 17 is a view similar to FIG. 16, but shows a different cross-sectional configuration for the slats.

FIGS. 16 and 17 illustrate two versions of side-by-side steel slats. FIG. 16 corresponds to the steel slat 104 shown in FIG. 14; FIG. 17 corresponds to a different slat configuration (indicated generally by arrow 116) that is shown in FIG. 15. As is apparent, the difference between the two embodiments lies in the top surfaces of the slats.

The FIG. 16 slats 104 have raised stiffening beads 118, 120. In the FIG. 17 slat configuration, stiffening is accomplished by raised side regions or side shoulders 122, 124.

The steel attachment plate 100 (illustrated in FIGS. 14 and 15) rests flush within the valley regions, indicated generally by arrows 126 and 128 in FIGS. 16 and 17, respectively.

The thickness of the steel attachment plate 100 may be a variable, although it is likely to fill the vertical heights of the valleys 126, 128 so that all of the attachment plates 100, for all of the slats, from one lateral side of the conveyor to the other (not shown) will present a substantially flush floor surface.

The number of fasteners used in any one attachment plate 100 may be a variable. Although two fasteners 110, 112 are illustrated in FIGS. 14 and 15, it may be determined that a greater number is desirable. Referring to U.S. Pat. No. 6,000,530, for example (which is incorporated here by reference and illustrates a slat-to-drive beam attachment means), a much larger number of fasteners may be used in order to spread out the drive forces through the slat.

FIGS. 16 and 17 show the slats 104, 116 mounted on bearings 130 similar to what was described above. Each slat may have a seal 132 captured in a roll-formed recess 134.

Figure 18A:
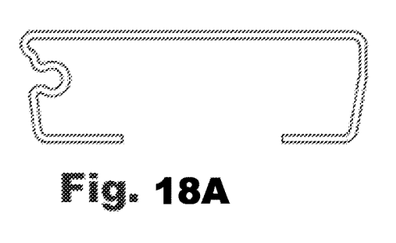
FIGS. 18A-18C are end-wise sectional views of slat cross sections and illustrate the dimensions thereof (in both English and metric dimensions).
Figure 18B:
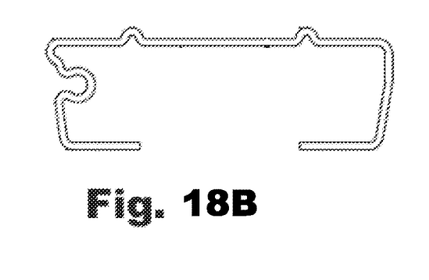
Figure 18C:
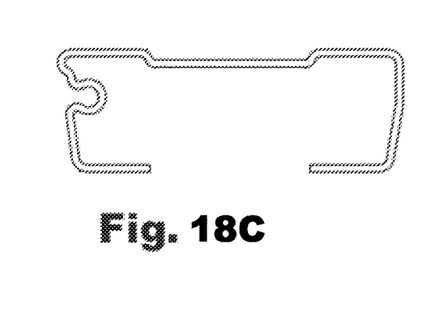

FIGS. 18A-18C show cross-sections of different all-steel slat configurations. FIGS. 18B and 18C show slats 104 and 116, respectively. Another slat configuration 136 is shown in FIG. 18A. Slat dimensions are illustrated in both English and metric units. These dimensions may vary during the course of further design work. For example, it is to be appreciated that the valley regions described above, indicated generally by arrows 126 and 128, respectively, define a "trough depth" that is spelled out as 0.118 inches in FIGS. 18B and 18C. The trough depth may be important because it allows the top surface 114 of the attachment plate 100 to not protrude above the plane defined by the height of the slat beads and shoulders shown at 118, 120, 122, 124, in FIGS. 16 and 17, respectively. This design allows pallets to slide over the top without hanging up on the attachment plate 100. Depending on the thickness of attachment plate 100 or other structural considerations the trough depth illustrated in FIGS. 18B and 18C might be increased from 0.118 inches to 0.150 inches, as an example.

The foregoing description is not intended to limit the scope of patent coverage. The scope of patent coverage is to be limited only by the patent claims allowed by the customs of local law, the interpretation of which is to be made in accordance with the doctrines of patent claim interpretation for the applicable jurisdiction.

What is claimed is:

1. A roll-formed steel slat for use in a reciprocating floor slat conveyor system, comprising a slat formed from a strip of steel, the slat being formed to have at least an upper load-carrying surface and a pair of side legs, with one side leg on each lateral side of the upper load-carrying surface, and with the side legs depending downwardly, and with the upper load-carrying surface having a pair of raised stiffening beads that create a valley region therebetween, for creating a region for receiving a fastener head generally along a center line of the upper load-carrying surface, and in a manner so that the fastener head has a vertical height that is no greater than the height of the raised stiffening beads, to enable a pallet to slide along the stiffening beads without being impeded by the fastener head in the valley region.

2. A roll-formed steel slat for use in a reciprocating floor slat conveyor system, comprising a slat formed from a strip of steel, the slat being formed to have at least an upper load-carrying surface and a pair of side legs, with one side leg on each lateral side of the upper load-carrying surface, and with the side legs depending downwardly, and with the upper load-carrying surface having a pair of raised side shoulders that create a valley region therebetween, for creating a region for receiving a fastener head generally along a center line of the upper load-carrying surface, and in a manner so that the fastener head has a vertical height that is no greater than the height of the raised side shoulders, to enable a pallet to slide along the stiffening beads without being impeded by the fastener head in the valley region.

* * * * *